(12) United States Patent
Onggosanusi et al.

(10) Patent No.: US 7,961,774 B2
(45) Date of Patent: Jun. 14, 2011

(54) MULTIPATH INTERFERENCE-RESISTANT RECEIVERS FOR CLOSED-LOOP TRANSMIT DIVERSITY (CLTD) IN CODE-DIVISION MULTIPLE ACCESS (CDMA) SYSTEMS

(75) Inventors: Eko N. Onggosanusi, Allen, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 687 days.

(21) Appl. No.: 10/687,303

(22) Filed: Oct. 14, 2003

(65) Prior Publication Data

US 2004/0076224 A1    Apr. 22, 2004

Related U.S. Application Data

(60) Provisional application No. 60/418,375, filed on Oct. 15, 2002.

(51) Int. Cl.
*H04B 1/69* (2011.01)
(52) U.S. Cl. ........ 375/144; 375/267; 375/295; 375/148; 455/423; 455/455; 455/101; 455/63.1; 370/342; 370/331; 370/249
(58) Field of Classification Search .................. 375/267, 375/348, 295, 148, 229, 144; 455/67, 63, 455/69, 101, 423, 455, 404, 63.1; 370/342, 331, 249

See application file for complete search history.

(56) References Cited

U.S. PATENT DOCUMENTS

| | | | |
|---|---|---|---|
| 6,766,144 B2* | 7/2004 | Kim et al. | 455/67.11 |
| 7,181,167 B2* | 2/2007 | Onggosanusi et al. | 455/63.1 |
| 2002/0027957 A1* | 3/2002 | Paulraj et al. | 375/267 |
| 2003/0148770 A1* | 8/2003 | Das et al. | 455/455 |
| 2003/0165131 A1* | 9/2003 | Liang et al. | 370/342 |
| 2004/0032910 A1* | 2/2004 | Horng et al. | 375/267 |
| 2004/0139140 A1* | 7/2004 | Becker | 708/650 |

* cited by examiner

*Primary Examiner* — Eva Y Puente
(74) *Attorney, Agent, or Firm* — Ronald O. Neerings; Wade James Brady, III; Frederick J. Telecky, Jr.

(57) ABSTRACT

System and method for providing interference resistance in communications systems using closed-loop transmit diversity (CLTD). A preferred embodiment comprises: at a receiver, computing a CLTD weighting vector from a received signal, providing the CLTD weighting vector to a transmitter, and using the CLTD vector to suppress interference in the received signal, and at a transmitter, transmitting a signal, receiving the CLTD weighting vector from the receiver, and applying the CLTD weighting vector to all subsequent transmissions.

18 Claims, 3 Drawing Sheets

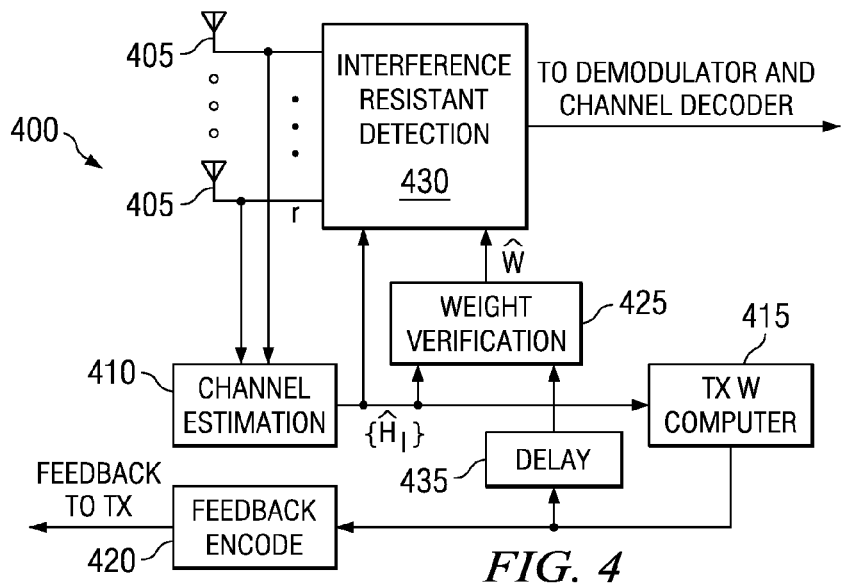
FIG. 4
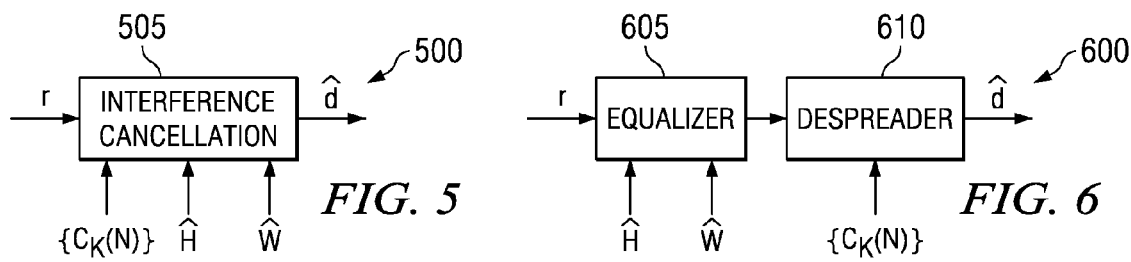
FIG. 5
FIG. 6
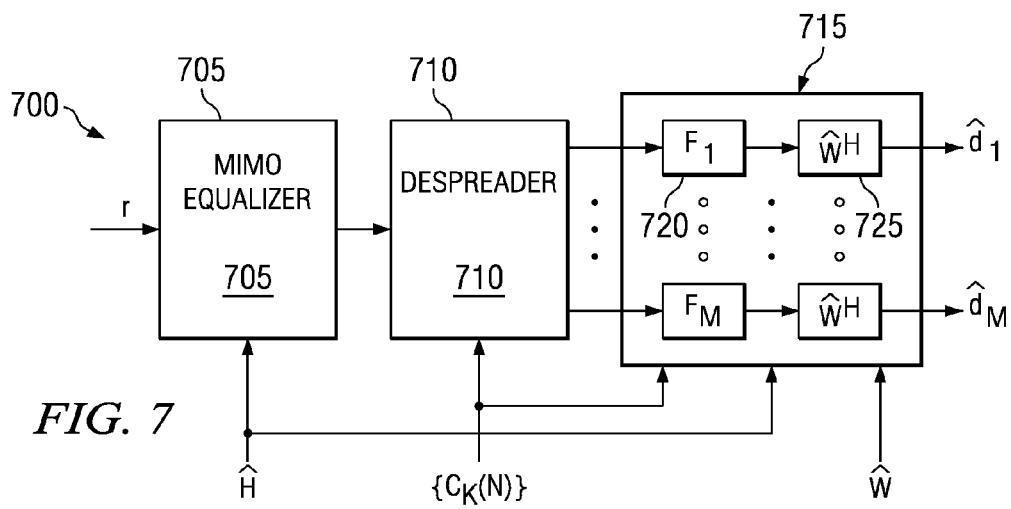
FIG. 7

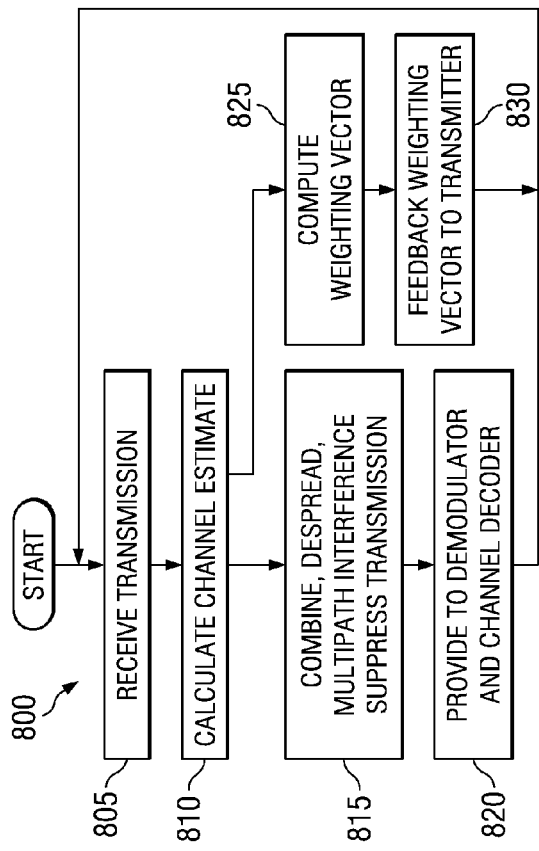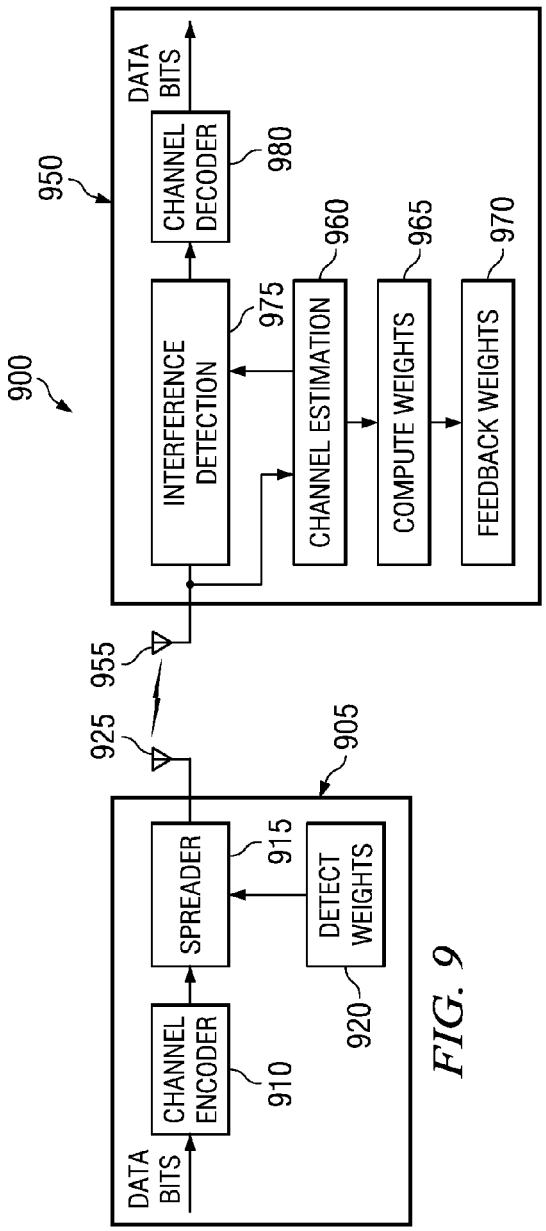

ND OTHER
MULTIPATH INTERFERENCE-RESISTANT RECEIVERS FOR CLOSED-LOOP TRANSMIT DIVERSITY (CLTD) IN CODE-DIVISION MULTIPLE ACCESS (CDMA) SYSTEMS

This application claims the benefit of U.S. Provisional Application No. 60/418,375, filed on Oct. 15, 2002, entitled "Multipath Interference-Resistant Receivers for Closed-Loop Transmit Diversity in Downlink CDMA Systems," which application is hereby incorporated herein by reference.

TECHNICAL FIELD

The present invention relates generally to a system for digital wireless communications, and more particularly to a system for digital wireless communications using closed-loop transmit diversity.

BACKGROUND

As the demand for increased bandwidth in wireless communications systems continues to grow, designers of the wireless communications systems are bumping into limitations (both physical and regulatory) on the amount of spectrum that can be used. With more wireless communications systems being put into service, the amount of spectrum that each can use is naturally reduced. Additional restrictions may be placed by governmental bodies, such as the Federal Communications Commission (FCC) in the United States. The FCC restricts the use of wireless communications systems to approved bands.

With more wireless communications devices sharing a fixed amount of spectrum, interference can play a significant role in the performance of a wireless communications system. One technique that can help a wireless communications system achieve improved performance in the presence of interference entails the use of multiple transmit antennas. This technique is commonly referred to as transmit antenna diversity. Each of the transmit antennas can transmit either a portion of the overall signal or the same signal that has been encoded differently. At the receive end, one or more receive antennas can be used to receive the signal. With processing, the original transmitted signal can be extracted from what was received.

There are two main types of transmit antenna diversity. A first, referred to as open-loop transmit diversity (OLTD), simply uses multiple transmit antenna and it is up to the receiver to decode the transmitted information. A second, referred to as closed-loop transmit diversity (CLTD), uses a feedback loop to provide information regarding the transmission channel in an attempt to improve the overall performance of the wireless communications system.

Currently used CLTD systems, such as those in the downlink (from base station to mobile station) of a WCDMA (wideband CDMA, a third generation mobile communications standard) compliant wireless communications network, can provide significant performance gains over OLTD systems. In these systems, the transmitter is provided channel state information (CSI) by the receiver. When the system is using frequency division duplex (FDD), the CSI can be provided by a feedback channel and when the system is using time division duplex (TDD), CSI can be determined by examining an uplink channel.

One disadvantage of the prior art is that they assume that multipath interference is negligible and therefore simple maximum ratio combining is sufficient to combine the signals from the various transmit antennas. For systems with a large spreading gain, this assumption may be valid. However, for high-data rate systems that use a small spreading gain, multipath interference may manifest itself as inter-symbol interference (ISI) and/or multi-user interference (MUI). The ISI and/or MUI can affect the overall performance of the CLTD system.

SUMMARY OF THE INVENTION

These and other problems are generally solved or circumvented, and technical advantages are generally achieved, by preferred embodiments of the present invention which provides multipath interference receivers for use in closed-loop transmit diversity (CLTD) code-division multiple access (CDMA) systems.

In accordance with a preferred embodiment of the present invention, a method for interference-resistance using closed-loop transmit diversity (CLTD) at a receiver comprising receiving a signal, computing a CLTD weighting vector from the received signal, providing the CLTD weighting vector to a transmitter, and using the CLTD weighting vector to suppress interference is provided.

In accordance with another preferred embodiment of the present invention, a method for interference-resistance using closed-loop transmit diversity (CLTD) comprising, at a receiver receiving a signal, computing a CLTD weighting vector from the received signal, providing the CLTD weighting vector to a transmitter, and using the CLTD weighting vector to suppress interference is provided. The method further comprising, at a transmitter transmitting a signal, receiving the CLTD weighting vector, and applying the CLTD weighting vector to subsequent transmissions.

In accordance with another preferred embodiment of the present invention, a receiver comprising a channel estimation unit coupled to a signal input, the channel estimation unit containing circuitry to calculate an estimate of a communications channel, a weighting vector unit coupled to the channel estimation unit, the weighting vector unit containing circuitry to compute a weighting vector from the estimate of the communications channel, a feedback unit coupled to the weighting vector unit, the feedback unit to provide the estimate of the communications channel back to a source of a received signal provided by the signal input, and an interference resistant detection unit coupled to the signal input, the interference resistant detection unit containing circuitry to use the estimate of the communications channel and the weighting vector to improve interference resistance of the receiver is provided.

In accordance with another preferred embodiment of the present invention, a communications system comprising a transmitter coupled to a data source, the transmitter containing circuitry to encode and spread a data stream provided by the data source and to transmit the encoded and spread data stream, a communications channel coupled to the transmitter, the communications channel to carry the transmitted encoded and spread data stream, a receiver coupled to the communications channel, the receiver comprising a channel estimation unit coupled to a signal input, the channel estimation unit containing circuitry to calculate an estimate of a communications channel, a weighting vector unit coupled to the channel estimation unit, the weighting vector unit containing circuitry to compute a weighting vector from the estimate of the communications channel, a feedback unit coupled to the weighting vector unit, the feedback unit to provide the estimate of the communications channel back to a source of a received signal provided by the signal input, and an interference resistant detection unit coupled to the signal input, the interference resistant detection unit containing circuitry to use the estimate of the communications channel and the weighting vector to improve interference resistance of the receiver is provided.

An advantage of a preferred embodiment of the present invention is that resistance to multipath interference is provided in a CDMA communications system. Multipath interference resistance can help to improve the performance of the CDMA communications system by reducing ISI and MUI.

A further advantage of a preferred embodiment of the present invention is that the resistance to multipath interference is provided in a CDMA communications system with a small spreading gain. The use of a small spreading gain permits high data transmission rates.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a diagram of a portion of an interference-resistant receiver used in a closed-loop transmit diversity wireless communications system, according to a preferred embodiment of the present invention;

FIG. 5 is a diagram of data flow in a portion of an interference cancellation based interference-resistant receiver used in a closed-loop transmit diversity wireless communications system, according to a preferred embodiment of the present invention;

FIG. 6 is a diagram of data flow in a portion of an equalizer based interference-resistant receiver used in a closed-loop transmit diversity wireless communications system, according to a preferred embodiment of the present invention;

FIG. 7 is a diagram of data flow in a portion of a second equalizer based interference-resistant receiver used in a closed-loop transmit diversity wireless communications system, according to a preferred embodiment of the present invention;

FIG. 8 is a flow diagram of a sequence of operation in a receiver providing closed-loop transmit diversity to a transmitter, according to a preferred embodiment of the present invention; and FIG. 9 is a diagram of a wireless communications system using closed-loop transmit diversity.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a CDMA communications system adherent to UMTS (Universal Mobile Telephony System) technical standards, commonly referred to as WCDMA. An overview of the UMTS technical standard is provided in a document entitled "$3^{rd}$ Generation Partnership Project; Technical Specifications Group Services and System Aspects General UMTS Architecture (Release 4)," which is herein incorporated by reference. The invention may also be applied, however, to other CDMA communications systems that make use of CLTD with or without the use of orthogonal spreading codes, such as IS-95, CDMA2000, and so forth.

Figure 1:
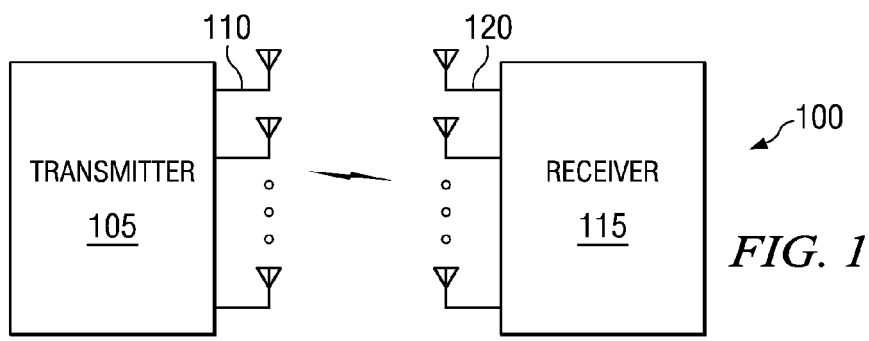
FIG. 1 is a diagram of a downlink in a wireless communications system.

With reference now to FIG. 1, there is shown a diagram illustrating a downlink in an exemplary wireless communications system 100 wherein a transmitter 105 can make use of multiple transmit antennas 110 and a receiver 115 can make use of multiple receive antennas 120. Note that the wireless communications system 100 displayed in FIG. 1 shows only the downlink, for example, a downlink from a base station to a mobile station. A typical bi-directional communications link would have both a downlink and an uplink.

The transmitter 105 may have up to P transmit antennas 110, where P is an integer number greater than two (2), while the receiver 115 may have up to Q receive antennas 120, where Q is an integer number greater than two (2). Note that there need not be any relationship between P and Q. A typical value for P would be two (2). Note also that even if a transmitter were to use transmit diversity, a receiver does not need to have more than one (1) receive antenna in order to communicate with the transmitter.

Figure 2A:
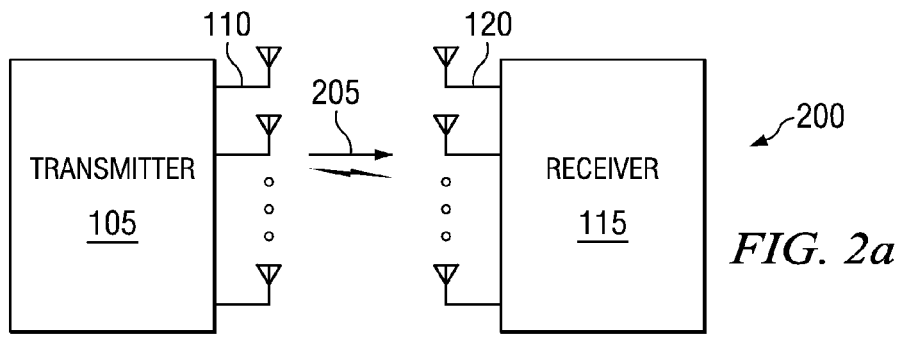
FIGS. 2a and 2b are diagrams of open-loop and closed-loop transmit diversity wireless communications systems.
Figure 2B:
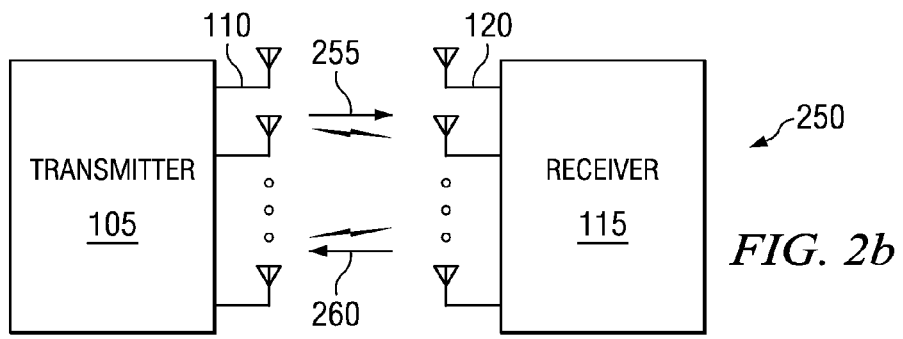

With reference now to FIGS. 2a and 2b, there are shown diagrams illustrating the use of open-loop transmit diversity (OLTD) and closed-loop transmit diversity (CLTD) in a wireless communications system. FIG. 2a illustrates a portion of a wireless communications system 200 using OLTD. In OLTD, a transmitter (for example, the transmitter 105) uses a transmission diversity scheme, such as space-time transmit diversity (STTD), to transmit data over multiple transmit antennas (such as the transmit antennas 110) via a uni-directional communications link 205 (a downlink). The transmitter 105 makes an estimate of the channel characteristics and may make adjustments to its transmission based on the channel estimate. Since there is no feedback information, the transmitter 105 has no real information regarding the quality of its channel estimate. Therefore, the transmitter 105 does not really know how well the transmit diversity is working.

FIG. 2b illustrates a portion of a wireless communications system 250 using CLTD. In CLTD, a transmitter (for example, the transmitter 105) uses a transmission diversity scheme to transmit data over multiple transmit antennas (such as the transmit antennas 110) over a uni-directional communications link 255. However, the transmitter 105 receives feedback information from a receiver (such as the receiver 115). The receiver 115 may provide to the transmitter 105 (over a unidirectional communications link 260) information such as channel state information or even weighting factors that can be used by the transmitter 105 to adjust its transmission.

If the wireless communications system 250 uses frequency-division duplex (FDD), wherein the uni-directional communications links 255 and 260 are transmitted at different frequencies so that they do not interfere with each other, then the information provided by the receiver 115 can be made available by the uni-directional communications link 260 (referred to as a feedback channel). If the wireless communications system 250 uses time-division duplex (TDD), then the transmitter 105 may be able to get information about the uni-directional communications link 255 by measuring the uni-directional communications link 260. This can be possible due to the fact that in wireless communications systems using TDD, the uni-directional communications links 255 and 260 share the same frequency and therefore should behave similarly.

Figure 3:
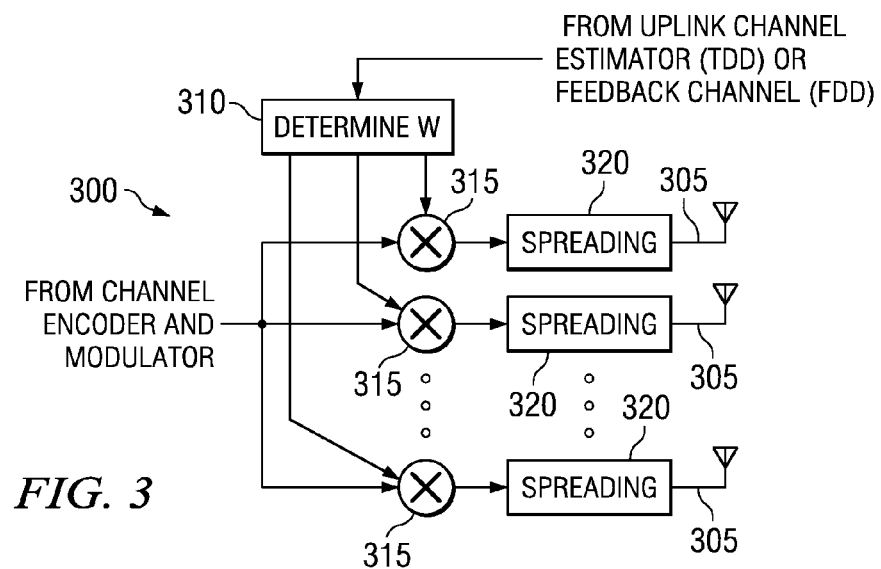
FIG. 3 is a diagram of a transmitter used in a closed-loop transmit diversity wireless communications system.

With reference now to FIG. 3, there is shown a portion of a generic transmitter 300 for use in a wireless communications network using CLTD. FIG. 3 displays a portion of a generic transmitter 300 that is used to apply an antenna diversity transmission scheme onto a signal to be transmitted. The generic transmitter 300, as illustrated in FIG. 3, has P transmit antennas (antennas 305). In order to use CLTD, a weighting vector, w, is chosen to maximize the signal-to-noise ratio (SNR) at a receiver. The weighting vector, w, is commonly referred to as a unit-norm vector and can be expressed as: $w=[w_1\ w_2\ \ldots\ w_P]^T$. As discussed previously, for wireless communications systems using FDD, w is selected at the receiver and signaled to the generic transmitter 300 via a feedback signal. For wireless communications systems using TDD, w can be determined at the generic transmitter 300 due to the availability of CSI via measurements of an uplink channel. This is shown in FIG. 3 by a "determine w" block 310, which receives input from an uplink channel estimator (if using TDD) or a feedback channel (if using FDD).

After the weighting vector, w, is determined, the individual terms of the vector can be multiplied with the signal to be transmitted via multipliers 315. Depending upon the particular antenna transmit diversity scheme used, the different terms of the weighting vector may be applied to the same signal or to different portions of the signal. After application of the weighting vector, the signal can be spread in individual spreading units 320 and then transmitted over-the-air via the antennas 305.

A general signal model can now be derived for use in later discussion. Consider a downlink direct sequence CDMA system with P transmit and Q receive antennas, and a spreading gain $N_C$. Let there be K independent sources utilizing the communications channel, where each source can be assigned to a distinct spreading code. The K sources may be associated with one or more users, as well as the pilot channel and other overhead channels. A transmitted signal from a k-th source, $X_k(t)=[x_{k,1}(t)\ x_{k,2}(t)\ \ldots\ x_{k,P}(t)]^T \in C^P$, undergoes a time- and frequency-selective P-input and Q-output channel with a delay spread of D. The baseband received signal, $r(t)=[r_1(t)\ r_2(t)\ \ldots\ r_Q(t)]^T \in C^P$, can be rewritten as:

$$r(t) = \sum_{k=1}^{K} \sqrt{\rho_k} \int_0^D H(t,\tau) X_k(t-\tau) d\tau + \eta(t)$$

$$H(t,\tau) = \begin{bmatrix} h_{11}(t,\tau) & h_{12}(t,\tau) & \cdots & h_{1P}(t,\tau) \\ h_{21}(t,\tau) & h_{22}(t,\tau) & \cdots & h_{2P}(t,\tau) \\ \vdots & \vdots & \ddots & \vdots \\ h_{Q1}(t,\tau) & h_{Q2}(t,\tau) & \cdots & h_{QP}(t,\tau) \end{bmatrix} \in C^{Q \times P}$$

$$X_k(t) = \sum_{n=-\infty}^{\infty} s_k(n) v_k(t-nT)$$

where $h_{qp}(t,\tau)$ is the downlink communications channel impulse response representing the coupling between the p-th transmit and the q-th receive antenna, $\rho_k$ denotes the k-th source power, T denotes one symbol duration, $s_k(n)=[s_{k,1}(n)\ s_{k,2}(n)\ \ldots\ s_{k,P}(n)]^T$ is the k-th source transmitted signal vector in symbol interval n, and $v_k(t)$ is the k-th source direct sequence CDMA signature waveform.

Assuming that the additive noise process is temporally and spatially white zero mean complex Gaussian noise with variance $\sigma^2$, the k-th source signature waveform can be written as:

$$v_k(t) = \sum_{l=-\infty}^{\infty} \sum_{i=0}^{N_C-1} c_{k,i}(l) \bar{\omega}(t - lT - i(T/N_C))$$

where $\bar{\omega}(t)$ is the unit-energy chip waveform and $\{c_{k,i}(n)\}$ is the k-th source (aperiodic) spreading code. Let $c_k(n)=[c_{k,0}(n)\ c_{k,1}(n)\ \ldots\ c_{k,N_C-1}(n)]^T \in C^{N_C}$ denote the k-th source spread code vector for the n-th symbol interval. The spreading codes for different sources can be orthogonal within a given symbol interval, that is, $c_k^H(n)c_{k'}(n)=\delta_{k,k'}$.

The sampling of r(t) at the chip rate allows the discrete-time processing within a block of N symbol intervals. Let $L=\lceil D/T_c \rceil$ and $$r = [\tilde{r}^T(0)\ \tilde{r}^T(0)\ \cdots\ \tilde{r}^T(0)]^T \in C^{NN_cQ} \quad (1)$$

$$\tilde{r}(n) = \int_{-\infty}^{\infty} r(t) \omega * (t - nT_C) dt$$

$$s_k = [s_k^T(0)\ s_k^T(1)\ \cdots\ s_k^T(N-1)]^T$$

$$H_l(n) = H(nT_C, lT_C).$$

It can then be shown that $$r = H \sum_{k=1}^{K} \sqrt{\rho_k}\ (C_k \otimes I_P) s_k + \eta \quad (2)$$

$$C_k = \begin{bmatrix} c_k(0) & & & \\ & c_k(1) & & \\ & & \ddots & \\ & & & c_k(N-1) \end{bmatrix} \in C^{NN_c \times N} \quad (3)$$

$$C_k^H C_k = \delta_{k,k} I_{NP} \quad (4)$$

$$\eta \sim N_C[0, \sigma^2 I_{NN_CQ}]$$

where $\otimes$ denotes the Kronecker product and the channel matrix $H \in C^{NN_CQ \times NN_CP}$ takes the following form:

$$H = \begin{bmatrix} H_0(0) & & & \\ H_1(1) & H_0(1) & & \\ \vdots & \vdots & & \\ H_L(L) & H_{L-1}(L) & \cdots & H_0(L) \\ \ddots & \ddots & & \ddots \\ & H_L(NN_C-1) & H_{L-1}(NN_C-1) & \cdots & H_0(NN_C-1) \end{bmatrix} \quad (5)$$

Note that when the communications channel is constant within N symbol intervals ($H_l(n)=H_l$), the channel matrix H is a block Toeplitz matrix. Note that the signal model in (2)-(5)

assumes the absence of inter-block interference, which can be the case when a guard of L symbols is inserted between two data blocks. In the presence of inter-block interference, overlapped block detection can be used to improve the reliability of symbol estimates. This can be done by discarding the symbol estimates at the edges of each block.

Now, let the desired direct sequence CDMA system utilize M codes, where M<K, and a generic transmitter (such as the generic transmitter 300 (FIG. 3)). The desired user weighting vector for symbol interval n as $w(n)=[w_1(n)\ w_2(n)\ \ldots\ w_P(n)]^T$. Note that the weighting vector is common for all M codes. Therefore, for $k=1, 2, \ldots, M$, $s_k(n)=w(n)d_k(n)$, where $d_k(n)$ is the transmitted symbol corresponding to the k-th code and symbol interval n that belongs to a constellation $C_k$ of size $|C_k|$. The received signal model in (2) may then be written as:

$$r = H\left(\sum_{k=1}^{M} \sqrt{\rho_k}\, (C_k \otimes I_P) W d_k\right) + H\left(\sum_{k=M+1}^{K} \sqrt{\rho_k}\, (C_k \otimes I_P) s_k\right) + \eta \quad (6)$$

$$= H\left(\sum_{k=1}^{M} \sqrt{\rho_k}\, (C_k \otimes I_P) W d_k\right) + Hi + \eta \quad (7)$$

$$W = \begin{bmatrix} w(0) & & & \\ & w(1) & & \\ & & \ddots & \\ & & & w(N-1) \end{bmatrix} \in C^{NP \times N} \quad (8)$$

$$d_k = [d_k(0)\ d_k(1)\ \cdots\ d_k(N-1)]^T \in C^N \quad (9)$$

where interference from other sources is denoted i. Note that the CLTD weighting matrix W is common for all M codes. The effect of CLTD weighting can be combined with the channel matrix as:

$$(C_k \otimes I_P) W = \tilde{W} C_k \quad (10)$$

$$\tilde{W} = \begin{bmatrix} I_{N_C} \otimes w(0) & & & \\ & I_{N_C} \otimes w(1) & & \\ & & \ddots & \\ & & & I_{N_C} \otimes w(N-1) \end{bmatrix} \in C^{NN_C P \times NN_C}$$

Therefore, (7) may be rewritten as:

$$r = H\tilde{W}\left(\sum_{k=1}^{M} \sqrt{\rho_k}\, C_k d_k\right) + Hi + \eta \quad (11)$$

The modified CLTD matrix, $\tilde{W}$, in (10) can be thought of as the chip-rate CLTD weighting matrix, whereas W in (8) is the symbol-rate CLTD weighting matrix. Hence, the signal component for the desired direct sequence CDMA system undergoes an effective channel, characterized by the $NN_C Q \times NN_C$ (chip-rate) channel matrix $H\tilde{W}$.

It is assumed that the desired direct sequence CDMA knows M codes $\{C_k\}_{k=1}^{M}$ that are used for transmitting its signals, as well as the corresponding power levels $\{\rho_k\}_{k=1}^{M}$. However, the desired direct sequence CDMA system may not know the codes that are used by the interferers (such as other users, pilot channels, and overhead channels). This knowledge may be obtained by performing energy detection in the code space (for example, using Walsh-Hadamard transform for WCDMA).

With reference now to FIG. 4, there is shown a diagram illustrating a portion of a generic receiver 400, wherein the generic receiver 400 is interference resistant and is used for CLTD, according to a preferred embodiment of the present invention. FIG. 4 displays a portion of the generic receiver 400 that can be used to extract a symbol stream from a signal received over-the-air that has a transmit antenna diversity scheme applied. Additionally, the portion of the generic receiver 400 can be used to compute a weighting vector, w, and then provide that weighting vector back to a transmitter (not shown). The generic receiver 400, as illustrated in FIG. 4, has Q receive antennas (antennas 405). Note that Q may be an integer number greater than or equal to one (1).

A channel estimation block 410 can be used to extract a pilot channel from a received signal received by the antennas 405. The extracted pilot channel can be used to configure a rake receiver, maximum ratio combining, and so forth. The channel estimation block 410 can be a part of a generic CDMA receiver, even if the CDMA receiver does not implement CLTD. When CLTD is implemented, the channel estimator block 410 can be used to create an estimate of a communications channel using the extracted pilot channel. From the estimate of the communications, a weighting vector can be created. Note that in a communications system using TDD, it is possible that the channel estimation and the generation of the weighting vector can be performed at a transmitter. Regardless, the generic receiver 400 may still perform the estimation of the communications channel and the generation of the weighting vector.

A transmitter weighting vector computer 415 can be used to compute the weighting vector based on the estimation of the communications channel. According to a preferred embodiment of the present invention, the transmitter weighting vector computer 415 can be used to compute a weighting term for each of the P transmit antennas used in the transmit antenna diversity scheme. An actual algorithm used to compute the terms of the weighting vector can vary depending on implementation and will not be discussed in these specifications. After computing the weighting vector, the generic receiver 400 can encode the weighting vector via the use of a feedback encode block 420 and transmit the encoded weighting vector back to the transmitter. Once the transmitter receives the encoded weighting vector, it can decode the weighting vector and use the terms of the weighting vector to apply a weighting factor to its transmitted signal.

After the transmitter receives the weighting vector from the generic receiver 400 (or in a TDD system, derives its own weighting vector), it can begin applying the weighting vector to the data it is transmitting. Note that in many cases, the weighting vector is applied only to the data being transmitted and not to the pilot channel. This means that information that the generic receiver 400 receives from the transmitter via the communications channel will have the weighting vector applied.

The generic receiver 400 can take advantage of the application of the weighting vector onto the data channels by examining the data received on the data channels and verifying that the weighting vector being used by the transmitter is indeed the weighting vector provided by the generic receiver 400 via the feedback channel. The checking and verifying of the weighting vector used by the transmitter can be performed in a weight verification unit 425. The weight verification unit 425 can provide the weighting vector computed by the generic receiver 400 to an interference resistant detection unit 430.

The interference resistant detection unit 430 can have as its input the received signal from the Q received antennas 405.

From the received signal, the interference resistant detection unit 430 can apply an inverse of the transmit antenna diversity scheme used by the transmitter. By applying an inverse of the transmit antenna diversity scheme, the interference resistant detection unit 430 can extract the transmitted data from the received signal. From this, the weighting vector used by the transmitter can be determined. The actual transmit antenna diversity scheme and the inverse operation are considered well understood by those of ordinary skill in the art of the present invention and will not be discussed herein.

A delay block 435 can also be used in the verification of the weighting vector. The delay block can be used to permit the comparison of the weighting vector being fed back to the transmitter and the weighting vector being used by the transmitter to transmit its data. The use of the delay block 435 can negate the need to store the weighting vector being fed back to the transmitter. Note that it is possible to store the weighting vector and not have the block 435.

Output from the interference resistant detection unit 430 can then be provided to a demodulator and channel decoder, wherein the actual information being carried in the received signal can be decoded and made into a form that is usable by devices coupled to the generic receiver 400. After the demodulator and channel decoder, the received signal may be processed by error detectors and correctors, deinterleavers, depuncturers, and so forth.

With reference now to FIG. 5, there is shown a diagram illustrating data flow in a portion of an interference cancellation based interference-resistant receiver 500 for CLTD, according to a preferred embodiment of the present invention. Note that FIG. 5 provides a view of a portion of the interference-resistant receiver 500 that emphasizes the flow of the data into and out of an interference-resistant detection block (such as the interference-resistant detection block 430 (FIG. 4)) and the remainder of the interference-resistant receiver 500 is not shown.

An input signal, r, as received by receive antennas (such as the Q receive antennas 405 (FIG. 4)) of the interference-resistant receiver 500 can be provided to an interference cancellation block 505. The interference cancellation block 505 can make use of the fact that it is very likely that the interference-resistant receiver 500 will know the M spreading codes used to transmit data, wherein M is the number of users. The input signal, r, can be rewritten as:

$$r = H\tilde{W}\underbrace{[\sqrt{\rho_1}\,C_1 \;\; \sqrt{\rho_2}\,C_2 \;\cdots\; \sqrt{\rho_M}\,C_M]}_{=A\in C^{N_cQ\times NM}} \underbrace{\begin{bmatrix} d_1 \\ d_2 \\ \vdots \\ d_M \end{bmatrix}}_{=d\in C^{NM}} + Hi + \eta \quad (12)$$

The interference-resistant receiver 500 may then perform the following operation, using zero-forcing and minimum mean square error:

$$y_{ZF} = (A^H A)^{-1} A^H r, N_c Q \geq M \quad (13)$$

$$y_{MMSE} = (A^H A + \sigma^2 \Lambda^{-1})^{-1} A^H r = \Lambda A^H (A\Lambda A^H + \sigma^2 I_{NN_cQ})^{-1} r \quad (14)$$

$$\Lambda = E[dd^H].$$

Soft estimates (output of the interference cancellation block 505) of the symbol vector, d, can be obtained as $\hat{d}=y$. Note that ZF (zero-forcing) and MMSE (minimum mean square error) are two common criterions that can be used to determine the symbol vector and that other criterion can be used. The zero forcing criteria may simply involve the complete inversion of the channel, while the minimum mean square error criteria can balance the complete inversion of the channel with noise enhancement. In practice, to avoid a matrix inverse computation this scheme can be implemented as a parallel or serial interference cancellation (PIC/SIC), which should be known to those of ordinary skill in the art of the present invention.

In the case when the interference-resistant receiver 500 also knows the spreading codes of other sources in addition to its own M spreading codes, the interference components corresponding to those codes can also be eliminated. For example, when code M+1, ..., K' are known, the matrix A and $\Lambda$ in equations (13) and (14) can be replaced with:

$$\tilde{A}=H[\sqrt{\rho_1}\tilde{W}C_1 \ldots \sqrt{\rho_M}\tilde{W}C_M\sqrt{\rho_{M+1}}(C_{M+1}\otimes I_P)\ldots \sqrt{\rho_{K'}}(C_{K'}\otimes I_P)]$$

$$\tilde{\Lambda}=E[\tilde{d}\tilde{d}^H]$$

$$\tilde{d}=[d^T s_{M+1}{}^T \ldots s_{K'}{}^T]^T$$

and the soft estimates of the symbol vector, d, can be obtained as $\hat{d}=[y]_{1:NM}$.

With reference now to FIG. 6, there is shown a diagram illustrating data flow in an equalizer based interference-resistant receiver 600 for CLTD, according to a preferred embodiment of the present invention. Note that FIG. 6 provides a view of a portion of an equalizer based interference-resistant receiver 600 that places emphasis on the flow of data into and out of an interference-resistant detection block (such as the interference-resistant detection block 430 (FIG. 4)) and the remainder of the interference-resistant receiver 600 is not shown.

The interference cancellation based interference-resistant receiver 500 (FIG. 5) made use of the M codes used to spread the data that it receives from a transmitter in order to obtain an estimate of transmitted symbols. Alternatively, the fact that the M sources associated with the transmitter share the same effective channel, $H\tilde{W}$, may be exploited. Because the effective channel, $H\tilde{W}$, can be approximately time-invariant or stationary for a sufficiently short time (depending upon the channel coherence time), an equalizer can be used to restore the orthogonality of the M sources. The equalization of the effective channel may take place in an equalizer 605. Referring back to equation (11), the operation of the equalizer 605 on the received signal, r, can be expressed as:

$$z_{ZF}=(\tilde{W}^H H^H H \tilde{W})^{-1}\tilde{W}^H H^H r \quad (15)$$

$$z_{MMSE} = \left(W^H H^H H \tilde{W} + (\sigma^2/\mu)I_{NN_c}\right)^{-1}\tilde{W}^H H^H R \quad (16)$$

$$= \tilde{W}^H H^H \left(H\tilde{W}\tilde{W}^H H^H + (\sigma^2/\mu)I_{NN_cQ}\right)^{-1} r$$

$$\mu = \frac{1}{N_c}\sum_{k=1}^{M}\rho_k \varepsilon_k,\;\; \varepsilon_k = E[|d_k(n)|^2]$$

Then, the output of the equalizer can be despread and scaled to obtain the soft estimates of the symbol vector, d, as follows:

$$\hat{d}_m = \rho_m^{-1/2}\times C_m{}^H z, m=1,2,\ldots,M$$

with the despreading possibly being performed in a despreader unit 610.

According to a preferred embodiment of the present invention, the equalizer 605 may be implemented as a filter. In order to track the variation in the effective channel, the equalizer can be implemented adaptively. A number of (blind)

adaptive equalizer algorithms for CDMA can be used, such as (but not limited to) Griffith algorithm, CR-MOE, and pre-filter Rake. Note that the term blind can be used to indicate the absence of a reference signal. These adaptive equalizer algorithms are considered to be well understood by those of ordinary skill in the art of the present invention.

According to a preferred embodiment of the present invention, one equalizer filter can be used for each receive antenna, hence for a Q receive antenna system, Q equalizer filters should be used. In general, the Q equalizer filters should be adapted in a joint fashion in order to achieve the best performance. However, adaptive algorithms that use the common pilot channel as a reference signal (such as Normalized LMS algorithm) should not be used. This is due to the fact that the common pilot channel does not utilize CLTD and the effective channel requiring equalization contains the CLTD weighting vectors.

With reference now to FIG. 7, there is shown a diagram illustrating data flow in a second equalizer based interference-resistant receiver 700 for CLTD, according to a preferred embodiment of the present invention. Note that FIG. 7 provides a view of a portion of an equalizer based interference-resistant receiver 700 that places emphasis on the flow of data into and out of an interference-resistant detection block (such as the interference-resistant detection block 430 (FIG. 4)) and the remaining portions of the interference-resistant receiver 700 are not shown.

The interference cancellation based interference-resistant receiver 500 (FIG. 5) made use of the M codes used to spread the data that it receives from a transmitter in order to obtain an estimate of the transmitted symbols, while the equalizer based interference-resistant receiver 600 (FIG. 6) equalizes the effective channel, $H\hat{W}$, to restore the orthogonality of the M sources. It can also be possible to equalize the propagating multiple-input, multiple-output (MIMO) channel, H, which may be used by all K sources (where K is greater than or equal to M) to restore orthogonality to the M sources.

The equalization of the MIMO channel, H, can take place in a MIMO equalizer 705. Referring back to equation (7), the equalization of the MIMO equalizer 705 on the received signal, r, can be expressed as:

$$z_{ZF} = (H^H H)^{-1} H^H r, Q \geq P \quad (17)$$

$$z_{MMSE} = (H^H H + (\sigma^2/\mu) I_{NN_C P})^{-1} H^H r \quad (18)$$
$$= H^H (HH^H + (\sigma^2/\mu) I_{NN_C Q})^{-1} r$$

$$\mu = \frac{1}{N_c} \sum_{k=1}^{M} \rho_k \varepsilon_k, \quad \varepsilon_k = E\left[|d_k(n)|^2\right]$$

When knowledge of interferer power is possible, then μ can be increased accordingly to account for the interferer power. In practice, the MIMO equalizer can be implemented using any adaptive filtering algorithms mentioned above. However, unlike the previous equalizer-based scheme, algorithms that use the common pilot channel as a reference signal can be applicable here. This is because the MIMO equalizer simply equalizes the propagating channel without making use of the CLTD weighting vector information. In this case, the MIMO equalizer consists of P*Q filters, with each of the Q filters trained to equalize the Q-output channel corresponding to each transmit antenna. P groups of filters corresponding to different transmit antennas are trained separately. Output of the MIMO equalizer 705 can then be despread (in a despreader 710) to obtain the transmitted signal associated with the M desired sources:

$$y = \begin{bmatrix} y_m(0) \\ y_m(1) \\ \vdots \\ y_m(N-1) \end{bmatrix} = (C_m^H \otimes I_P) z = \begin{bmatrix} (c_m(0)^H \otimes I_P) z(0) \\ (c_m(1)^H \otimes I_P) z(1) \\ \vdots \\ (c_m(N-1)^H \otimes I_P) z(N-1) \end{bmatrix}$$

where $z = [z(0)^T z(1)^T \ldots z(N-1)^T]^T$. Due to the orthogonality of the spreading codes in equation (4), the interference from other undesired sources can be suppressed after the despreading operation. Subsequent to the despreading operation, coherent combining (in a coherent combiner 715) with the weighting vector within each symbol interval, n, may be performed. This may be followed with amplitude scaling to obtain the soft estimate of $d_m(n)$. This can be written as (m=1,2, ..., M)

$$\hat{d}_m(n) = \rho_m^{-1/2} w^H(n) F_m(n) y_m(n), n=0,1,\ldots,N-1 \quad (19)$$

where $F_m(n) \in C^{P \times P}$ is a matrix chosen to maximize the CLTD coherent combining gain.

With reference now to FIG. 8, there is shown a flow diagram illustrating a sequence of operations 800 in a receiver that provides CLTD to a transmitter, according to a preferred embodiment of the present invention. According to a preferred embodiment of the present invention, the sequence of operations 800 illustrated in FIG. 8 is for a receiver in a communications system wherein a transmitter makes use of CLTD to help improve transmission performance. Additional operations may be performed by the receiver depending upon specific interference cancellation methods used by the receiver, which may vary among the various methods.

The sequence of operations 800 may begin when the receiver is initially powered on (or after being reset) and may occur during what may be commonly referred to as a training period. During a training period, the receiver may receive special transmissions from a transmitter that can be used to help the receiver configure its receive circuitry for optimum performance based on communications channel conditions. Additionally, the receiver may also make use of the received transmissions and compute information that may be helpful to the transmitter. Alternatively, the sequence of operations 800 may occur during normal transmissions at periodic intervals or when performance drops below a predetermined threshold.

After receiving transmissions from the transmitter (block 805), the receiver can proceed by calculating an estimate of the communications channel (block 810). The channel estimation calculated by the receiver can be used in several different ways. A first use of the channel estimation can be to assist in the combining, despreading, and multipath interference suppression of the received transmission (block 815). The processing of received signals is considered to be well understood by those of ordinary skill in the art of the present invention. After processing (including combining, despreading, and interference suppression), the received transmission may then be provided to a demodulator and channel decoder (block 820) to be converted into information that can be usable by devices attached to the receiver.

A second use of the channel estimation can be in the computation of feedback information to be provided to the transmitter to help the transmitter improve its transmission by matching the transmission with communications channel conditions. The channel estimate can be used in the computation of a weighting vector, w (block 825). After the weighting vector, w, has been computed, the receiver can provide the weighting vector, w, to the transmitter via a feedback mechanism (block 830), such as an uplink channel estimator (for TDD systems) or a feedback channel (for FDD systems).

After the computation of the weighting vector, w, and providing it back to the transmitter, the performance of the weighting vector, w, can be verified. While the received signal is being combined, despread, and multipath interference suppressed (block 815), the weighting vector, w, may also be verified. The verification of the weighting vector, w, may involve the computation of a new weighting vector and then comparing it with the weighting vector, w, computed in block 825. Alternatively, the general performance of the received transmission using the computed weighting vector, w, may be compared with received transmissions without the use of the weighting vector. A sufficient amount of improvement may be adequate to show that the weighting vector has had a positive impact.

With reference now to FIG. 9, there is shown a diagram illustrating a communications system 900 with a transmitter 905 using CLTD, according to a preferred embodiment of the present invention. The communications system 900 may typically include a plurality of transmitters and receivers, although FIG. 9 displays the single transmitter 905 and a single receiver 950. The transmitter 905 receives data bits to be transmitted from a device (not shown) coupled to the transmitter 905. Examples of the data bits may include binary data, encoded music and video, encoded (or unencoded) voice, sensor and telemetry information, and so forth. The data bits may be provided to a channel encoder 910 wherein they may be encoded according to an encoding scheme used by the communications system 900.

The encoded data bits may then partitioned into multiple streams, wherein the partitioning can be dependent upon an antenna diversity scheme used by the communications system 900. Each of the multiple streams may then be spread by a spreader 915. In addition to spreading the encoded data bits according to a spreading scheme, the spreader 915 may apply a weight to each of the multiple streams. As discussed previously, the weights applied to the multiple streams can be provided to the transmitter 905 by the receiver 950. A determine weights unit 920 can receive the weight information provided by the receiver 950 and may perform any needed decoding and manipulation to convert the weight information into a form usable by the transmitter 905. Note that the application of the weights may occur prior to the spreading. Output of the spreader 915 may then be transmitted via an antenna 925. The antenna 925 may be displayed as a single antenna, but in an antenna diversity communications system, there will usually be two or more antennas.

At the receiver, one or more antennas (displayed in FIG. 9 as a single antenna 955), may be present to receive the transmission from the transmitter 905. The received transmission can be provided to one of two units in the receiver 950. Initially, when the receiver 950 may be in training mode (possibly after being powered on or reset or after communications performance drops below a predetermined threshold), the received transmission may be provided to a channel estimation unit 960 wherein the received transmission may be used to calculate an estimate of the communications channel. The channel estimate can then be provided to a compute weights unit 965 wherein a weighting vector, w, may be computed. The weighting vector, w, may then be provided back to the transmitter 905 by a feedback unit 970.

During normal communications mode, the received transmissions may be provided to an interference detect unit 975, wherein the received transmission can be combined, despread, and multipath interference suppressed using the channel estimation compute by the channel estimation unit 960 amongst other information. Output of the interference detect unit 975 may then be provided to a channel decoder unit 980 wherein data bits may be extracted from the received transmissions and provided to devices (not shown) coupled to the receiver 950.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for interference-resistance for multiple users using closed-loop transmit diversity (CLTD) at a receiver comprising:
   receiving a signal;
   computing a CLTD weighting vector from the received signal;
   providing the CLTD weighting vector to a transmitter; and
   using the CLTD weighting vector, a channel estimate, and spreading codes for each user to suppress interference by producing an estimate of the signal transmitted by the transmitter, wherein the estimate of the signal uses a zero forcing function expressed as:

$$y_{ZF}=(A^H A)^{-1} A^H r, N_C Q \geq M,$$

where r is the received signal, A is defined as $H\tilde{W}[\sqrt{\rho_1}C_1 \sqrt{\rho_2}C_2 \ldots \sqrt{\rho_M}C_M]$, H is the channel estimate, Nc is the spreading gain, Q is the number of received antennas, M is the number of multiple users, $\tilde{W}$ is the weighting vector, $\sqrt{\rho_i}$ is the i-th power source, and Ci is the i-th spreading code.

2. The method of claim 1, wherein the computing of the CLTD weighting vector comprises:
   calculating the channel estimate from the received signal; and
   computing the CLTD weighting vector based on the channel estimate.

3. The method of claim 1, wherein the estimate of the signal is implemented using a parallel or serial interference cancellation technique.

4. A method for interference-resistance for multiple users using closed-loop transmit diversity (CLTD) at a receiver comprising:
   receiving a signal;
   computing a CLTD weighting vector from the received signal;
   providing the CLTD weighting vector to a transmitter; and
   using the CLTD weighting vector, a channel estimate, and spreading codes for each user to suppress interference by
   equalizing the received signal; and
   despreading the equalized received signal;
   wherein equalizing the received signal is expressed as $$z_{ZF}=(\tilde{W}^H H^H H \tilde{W})^{-1} \tilde{W}^H H^H r,$$

where r is the received signal, H is the channel estimate, and $\tilde{W}$ is the weighting vector.

5. The method of claim 4, wherein the despreading applies the spreading codes from each user to the equalized received signal.

6. The method of claim 4, wherein the equalizing applies the CLTD weighting vector and the channel estimate to the received signal.

7. The method of claim 4, wherein an equalizer to perform the equalizing is implemented as a bank of P*Q filters, wherein P is the number of transmit antennas and Q is the number of receive antennas.

8. A receiver comprising:
a channel estimation unit coupled to a signal input, the channel estimation unit containing circuitry to calculate an estimate of a communications channel;
a weighting vector unit coupled to the channel estimation unit, the weighting vector unit containing circuitry to compute a computed weighting vector from the estimate of the communications channel;
a feedback unit coupled to the weighting vector unit, the feedback unit to provide the computed weighting vector back to a source of the received signal provided by the signal input;
a weight verification unit coupled to the channel estimation unit and the weighting vector unit, the weight verification unit containing circuitry to generate a comparison result by comparing the computed weighting vector with a received weighting vector received by the signal input; and
an interference resistant detection unit coupled to the signal input and to the weight verification unit, the interference resistant detection unit containing circuitry to use the estimate of the communications channel, spreading codes, and the weighting vector comparison result for interference resistance of the receiver, wherein the receiver receives signals from a plurality of users.

9. The receiver of claim 8, wherein the interference resistant detection unit first equalizes the received signal and then despreads the equalized received signal.

10. The receiver of claim 8, wherein the interference resistant detection unit first equalizes the received signal, then despreads the equalized received signal, and then coherently combines the despread received signal.

11. The receiver of claim 8, wherein the communications channel is a wireless communications channel.

12. The receiver of claim 11, wherein the receiver is enabled to receive the wireless communications channel in a code-division multiple access (CDMA) communications system.

13. The receiver of claim 11, wherein a transmitter transmits an encoded and spread data stream over multiple antennas.

14. A method for interference-resistance for multiple users using closed-loop transmit diversity (CLTD) comprising:
receiving a first signal at a receiver;
the receiver computing a first CLTD weighting vector from the first received signal;
the receiver providing the CLTD weighting vector to a transmitter;
receiving a second signal weighted by a second CLTD weighting vector at the receiver;
the receiver comparing the first and second CLTD weighting vectors; and
the receiver suppressing interference, using a channel estimate and spreading codes for each user, based on a result of the comparison of the first and second CLTD weighting vectors, wherein the suppressing interference further comprises:
producing an estimate of the second signal, wherein estimates for the second signal use a minimum mean square error function expressed as:

$$y_{MMSE} = (A^H A + \sigma^2 \Lambda^{-1})^{-1} A^H r = \Lambda A^H (A \Lambda A^H + \sigma^2 I_{NN_C Q})^{-1} r,$$

where r is the received signal, A is defined as $H\tilde{W}[\sqrt{\rho_1}C_1 \sqrt{\rho_2}C_2 \ldots \sqrt{\rho_M}C_M]$, H is the channel estimate, Nc is the spreading gain, Q is the number of received antennas, M is the number of multiple users, $\tilde{W}$ is the weighting vector, $\rho_i$ is the i-th power source, $\Lambda = E[dd^H]$, I is the identity matrix, and Ci is the i-th spreading code.

15. The method of claim 14, wherein the estimate for second signal is implemented using a parallel or serial interference cancellation technique.

16. A method for interference-resistance for multiple users using closed-loop transmit diversity (CLTD) comprising:
receiving a first signal at a receiver;
the receiver computing a first CLTD weighting vector from the first received signal;
the receiver providing the CLTD weighting vector to a transmitter;
receiving a second signal weighted by a second CLTD weighting vector at the receiver;
the receiver comparing the first and second CLTD weighting vectors; and
the receiver suppressing interference based on a result of the comparison of the first and second CLTD weighting vectors, wherein the suppressing interference further comprises:
producing an estimate of the second signal, wherein estimates for the second signal are expressed as:

$$z_{MMSE} = \left( W^H H^H H \tilde{W} + (\sigma^2/\mu) I_{NN_C} \right)^{-1} \tilde{W}^H H^H R$$
$$= \tilde{W}^H H^H \left( H \tilde{W} \tilde{W}^H H^H + (\sigma^2/\mu) I_{NN_C Q} \right)^{-1} r,$$

where $$\mu = \frac{1}{N_c} \sum_{k=1}^{M} \rho_k \varepsilon_k,$$

$\varepsilon_k = E[|d_k(n)|^2]$, r is the received signal, H is the channel estimate, $\tilde{W}$ is the weighting vector, and I is the identity matrix.

17. A method for interference-resistance for multiple users using closed-loop transmit diversity (CLTD) comprising:
receiving a first signal at a receiver;
the receiver computing a first CLTD weighting vector from the first received signal;
the receiver providing the CLTD weighting vector to a transmitter;
receiving a second signal weighted by a second CLTD weighting vector at the receiver;
the receiver comparing the first and second CLTD weighting vectors; and
the receiver suppressing interference based on a result of the comparison of the first and second CLTD weighting vectors, wherein the suppressing interference further comprises:
producing an estimate of the second signal, wherein estimates for the second signal are expressed as:

$$z_{MMSE} = (H^H H + (\sigma^2/\mu)I_{NN_CP})^{-1} H^H r$$
$$= H^H(HH^H + (\sigma^2/\mu)I_{NN_CQ})^{-1} r$$

where $$\mu = \frac{1}{N_c}\sum_{k=1}^{M} \rho_k \varepsilon_k,$$

$\varepsilon_k = E[|d_k(n)|^2]$, r is the received signal, H is the channel estimate, and Q is the number of received antennas, $\rho_i$ is the i-th power source.

18. The receiver of claim 8, wherein the estimate of the communications channel uses a zero forcing function expressed as:

$$y_{ZF} = (A^H A)^{-1} A^H r, N_C Q \geq M,$$

where r is the received signal, A is defined as $H\tilde{W}[\sqrt{\rho_1}C_1 \sqrt{\rho_2}C_2 \ldots \sqrt{\rho_M}C_M]$, H is an estimate of the communications channel, Nc is a spreading gain, Q is a number of received antennas, M is a number of multiple users, $\tilde{W}$ is a weighting vector, $\sqrt{\rho_i}$ is an i-th power source, and Ci is an i-th spreading code.

* * * * *